Oct. 18, 1938.  L. V. McCARTY  2,133,556
PAN TYPE CONSTANT LEVEL DEVICE
Filed Aug. 14, 1936  3 Sheets-Sheet 1

INVENTOR.
Lourdes V. McCarty
BY John W. Michael
ATTORNEY.

Oct. 18, 1938.  L. V. McCARTY  2,133,556
PAN TYPE CONSTANT LEVEL DEVICE
Filed Aug. 14, 1936  3 Sheets-Sheet 3

INVENTOR.
Lourdes V. McCarty
BY John W. Michael
ATTORNEY.

Patented Oct. 18, 1938

2,133,556

UNITED STATES PATENT OFFICE 2,133,556

PAN-TYPE CONSTANT LEVEL DEVICE

Lourdes V. McCarty, Milwaukee, Wis., assignor to Automatic Products Company, Milwaukee, Wis., a corporation of Wisconsin Application August 14, 1936, Serial No. 96,041

21 Claims. (Cl. 137—68)

This invention relates to an improvement in constant level devices of the type equipped with a safety cut-off mechanism.

Generally speaking, it is well known in this art to provide a constant level device of the type comprising a casing providing a reservoir or liquid supply chamber, an inlet valve regulating flow of liquid into the casing, and a float suitably fulcrumed in the casing and cooperable with the valve to maintain a predetermined constant level of liquid in the reservoir or supply chamber. In actual practice it has been found that, at times, the inlet valve and its float fail to maintain the constant level so that the liquid rises to an abnormal level and there is danger of flooding. The presence of grit on the seat with which the inlet valve coacts may cause such a failure or it may be due to other reasons. To meet these conditions, safety cut-off mechanisms have been proposed and, in some instances, employ an auxiliary float which, upon the abnormal rise of liquid, is buoyed up to trip the mechanism and to allow a spring or weighted element thereof to punch the valve closed, or, in some instances, the liquid, when rising abnormally, is caused to overflow into a bucket which either trips or actuates the safety cut-off mechanism.

The present invention aims to improve and simplify a constant level device of the character equipped with a safety cut-off mechanism and, in carrying out this purpose, the present invention so combines a special pan-type float with the inlet valve and with a safety cut-off mechanism that the float is utilized for the dual purpose of normally maintaining the selected or constant level and of tripping the safety cut-off mechanism upon abnormal rise of liquid in the chamber or reservoir. This pan-type float is so combined with its associated elements and a resetting mechanism that when the parts are reset the float is tilted sufficiently to automatically spill or dump the overflow liquid therein back into the supply chamber.

Another object is to provide a device of this character which is simple and durable in its construction, reliable, safe and effective in its operation and easily and comparatively inexpensive to manufacture.

Other objects and advantages reside in certain novel features of the construction, arrangement and combination of parts which will be hereinafter more fully described and particularly pointed out in the appended claims, reference being had to the accompanying drawings, forming a part of this specification, and in which:

Figure 1:
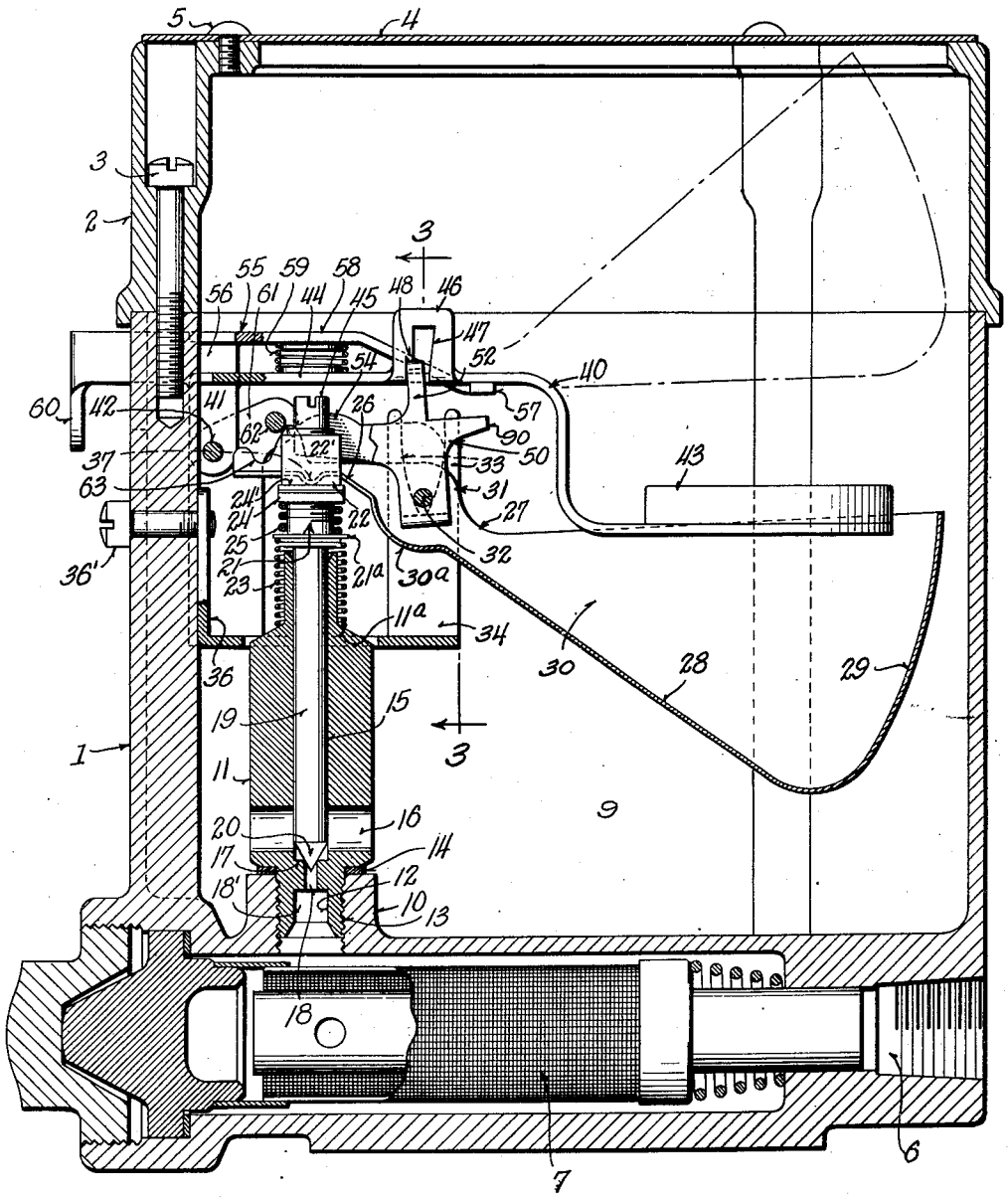
Figure 1 is a view partly in side elevation and partly in longitudinal vertical cross section showing one embodiment of the present invention.
Figure 2:
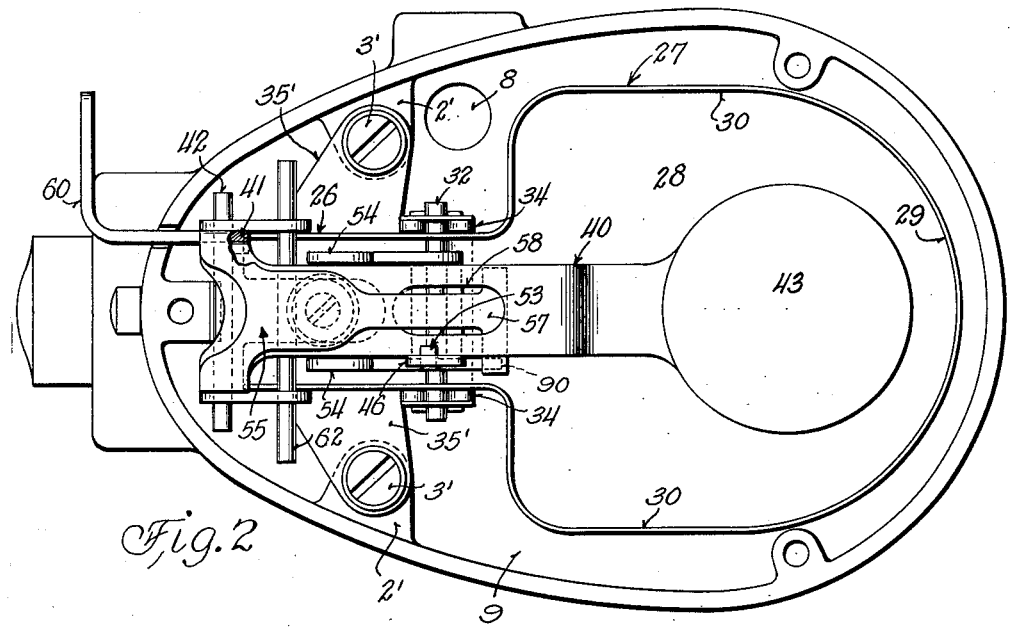
Figure 2 is a top plan view thereof with the cover removed.
Figure 3:
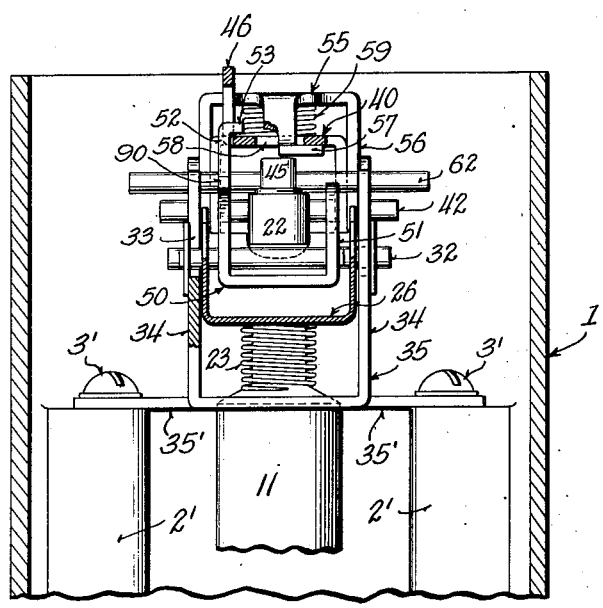
Figure 3 is a sectional view taken on line 3—3 of Figure 1.

Referring to the drawings, and more particularly to Figures 1 to 3, inclusive, the numeral 1 designates the casing or housing which is provided with a removable cover or top section 2 held in place on the upper edge of the housing by screws 3. The section 2 is provided at its top with a removable plate 4 releasably secured in position by screws 5. The lower portion of the housing 1 is provided with an inlet passage 6 designed to be connected to a source of supply of liquid such as fuel. In the passage 6 a strainer structure 7 may be provided. The casing 1 also has an outlet 8 shown in Figure 2, which is designed to be connected to the burner or other instrumentality to be supplied with the fuel or liquid. In some instances, these outlets are equipped with metering valves but as the present invention is not concerned with this part of the device it will not be further described.

The housing 1 provides a liquid supply chamber or reservoir 9. In the bottom of the housing or casing a flanged opening 10 is provided and freely communicates at its lower end with the inlet passage 6, although fuel flowing to the flanged opening 10 must first pass through the strainer 7.

An inlet valve casing 11 is provided in the chamber 9 and has its reduced lower end 12 threadably connected as at 13 with the flange 10. A gasket 14 may be compressed between the lower portion of the housing and the upper surface of the flange 10.

This valve casing or body 11 is provided with an axial opening 15 extending from its upper end down to a transverse passage 16 which intersects the axial passage 15. Below the transverse passage 16 a valve seat 17 is provided and from the valve seat down through the lower end of the valve body leads a smaller axial passage 18 which is enlarged as at 18' at the point where it communicates with the inlet passage.

An inlet valve 19 is provided and may be a needle valve having its lower beveled end 20 cooperable with the valve seat 17 to regulate the flow of liquid through the valve body and into the chamber 9. The main portion of the valve 19 is preferably a snug working fit in the axial passage 15 to be guided thereby. The valve 19 projects above the upper end of the valve body or casing 11. On the portion of the valve projecting above its casing 11, a sleeve 21 is secured in any suitable way. For example, it may be a press fit on the valve. The lower end of the sleeve 21 is provided with an integral annular flange 21a which provides an abutment for the upper end of a coil spring 23, the lower end of this coil spring bearing against a shoulder 11a formed on the valve casing 11. The spring 23 is under compression and it tends to bias the valve 19 to open position. Above the flange 21a the sleeve 21 is externally threaded so as to be adapted to interthread with a nut 22, opposite sides of which are flattened as at 22' to provide shoulders thereon and otherwise adapt it to coact with a lever extension 26 of a pan-type float designated generally at 27 in a manner which will be hereinafter more fully described.

A locking nut 24 may also be threaded on the sleeve to hold the nut in adjusted position. A spring 25 interposed and compressed between the upper face of the flange 21a and the lock nut 24 tends to hold the lock nut in position.

The float 27 may be stamped from a single piece of sheet metal and is in the form of a pan or trough having an imperforate slanting bottom wall 28, an imperforate end wall 29 integral therewith and imperforate side walls 30 which are integral with the bottom wall 28 and the end wall 29 and merge thereinto. The lever extension 26 is integral with the walls 28, 29 and 30 but its dimensions, both vertically and transversely, are substantially reduced, although the side walls of this extension at one point are enlarged as at 31 and provided with alined apertures to receive a pivot pin 32. The pin 32 projects at its ends beyond the sides of the portion of the float with which it is connected and its projecting ends rest in the crotch or lower end portions of V-shaped slots 33 which are provided on standards or vertical arms 34 of a mounting bracket designated generally at 35. The bracket 35 is provided with laterally extending attaching portions 35' which rest on and are secured by screws 3' to supporting projections 2' provided therefor and integral with the casing. The bracket 35 also has a rearwardly extending attaching portion 36 fastened by a screw 36' to the wall of the casing or housing 1.

Beyond the point where the lever extension 26 is pivotally mounted by the pivot pin 32 its vertical dimensions are further reduced and its bottom wall is longitudinally slotted so as to present a bifurcated lever end which straddles the nut 22. The members of this bifurcated end of the lever extension have their lower portions formed with bosses 37 which bear down on the upwardly facing shoulders presented by the nut 22 at the lower ends of the oppositely disposed flats thereon.

With the construction as thus far described, it will be seen that in operation the float 30 is normally buoyed up by the liquid in the chamber 9 so that the liquid will not ordinarily find its way into the interior of the float. As the liquid level in the chamber 9 rises the float 30, moving upwardly, causes its lever arm or extension 26 to move downwardly and the bosses 37 thereon bear down against the shoulders 24' on the nut 22 of the valve 19 whereby to press the valve downwardly against the action of its spring 23 and eventually into engagement with its valve seat to shut off the further flow of liquid when the desired liquid level is had in the chamber 9. When the liquid level falls below the selected or predetermined level the float 30 correspondingly lowers and in so doing its lever arm 26 and the bosses 37 thereof move upwardly away from the shoulders 24' to allow the valve spring 23 to open the valve and permit further flow of fuel thereinto. This operation goes on as fuel is drawn from the device and under ordinary conditions the mechanism thus far described provides a satisfactory control.

At times the presence of grit on the valve face or its valve seat or the sticking of some parts or the impairment of their structure will result in liquid flowing into the chamber 9 even after the desired level is had so that the liquid rises above the predetermined or selected level. With the present invention upon the occurrence of such conditions the liquid will flow into the interior of the pan-type float and the structure is such that the float when filled with liquid will sink down thereinto. The present invention utilizes this sinking of the pan-type float under such conditions to trip the safety cut-off mechanism which functions to punch the inlet valve 19 closed.

The safety cut-off mechanism comprises a lever 40 having downturned extensions 41 pivotally mounted on a pin 42 supported in pivot openings provided therefor in the rear side members 40' of the bracket 35. A weight 43 is secured to the inner end of the lever and biases the same to swing downwardly. When the lever so swings an imperforate portion 44 thereof strikes against the upper end 45 of the valve 19 to punch the same closed. A portion of one side edge of the lever 40 has a vertical and integral extension 46 provided with a slot 47, one edge of which is formed with a pointed shoulder 48. Cooperable with this slotted and shouldered extension 46 is a trip designated generally at 50. This trip 50 is constructed of sheet metal and has its body portion 51 of generally U-shape, which will be understood from Figure 3. The legs of the U-shaped portion are provided with openings through which the pivot pin 32 extends to support the trip 50 for rocking movement. One of the legs of the U-shaped body portion is extended to provide a finger 52 cooperable with the lever 40 and with the shoulder 48. As will be seen from Figure 3, the upper end of this finger 52 is inturned as at 53 so as to overlie the top surface of the adjacent edge of the lever 40 and also provide a surface adapted to have effective engagement with the pointed shoulder 48. Both side members of the body 51 of the trip are provided with trip arms 54 which are adapted to be engaged by side members of the bifurcated lever extension 26 when the float sinks thereby to swing the trip 50 in a clockwise direction as viewed in Figure 1 and disengage it from the shoulder 48 and to allow the safety cut-off lever 40 to function, that is, to punch the valve 19 closed.

For resetting the device a resetting lever designated generally at 55 is provided and may have integral therewith downwardly extending mounting strips 56 which are pivotally supported on the pin 42. This resetting lever overlies the cut-off lever and is provided with a downwardly offset T-shaped inner end 57. The shank of the T-shaped inner end is angled downwardly and extends through a slot 58 in the lever 40 whereas the cross member of the T-shaped end extends beyond the slot and is engaged with the underside of the lever 40. A spring 59 is interposed between the levers 40 and 55. One end of the lever 55 projects beyond the housing 1 and is provided with a finger piece or handle 60.

The bracket 35 is provided with parallel side extensions 61 connected by a stationary cross pin 62 which is designed to provide a fulcrum for the recesses 63 in the upper edges of the bifurcated lever extension 26 of the pan-type float when the device is being reset as will hereinafter more fully appear.

With this construction, when the level rises above the selected or predetermined level due to failure of valve 19 to close under the ordinary regulating action of the float 30 liquid will flow into the interior of the float and as it fills the float 30 will cause it to sink to swing downwardly. This causes the arms of its bifurcated lever extension 26 to engage the tripping arms 54 of the trip 50 and swing the trip to the right as viewed in Figure 1 until its inturned end 53 is disengaged from the shoulder 48 and the finger 52 is alined with the slot 47. The lever 40 then drops quickly down and its portion 44 strikes the upper end 45 of the valve and punches the valve closed.

Now then when the device is reset the lever 60 is pushed downwardly. This causes the inner end of the lever to swing upwardly and carry with it the lever 40. The lever 40 in turn pulls upwardly on the trip 50 due to the engagement of the inturned end 53 of the trip 50 with the top surface of the lever 40. The trip 50 now functions as a tie or hanger between the lever 40 and the float, since as the trip is pulled upwardly with the lever 40 it carries with it the pivot 42 which, in turn, moves the pan-type float 30 upwardly. This upward pulling continues until the recesses 63 engage the fulcrum pin 62 whereupon the float 30 is now constrained to swing about the fulcrum 62. The continued movement of the resetting lever 55 causes the float to swing to the dotted line position shown in Figure 1 in which it is so angled that the liquid that has flowed into its interior will run out of the small end at the point 30ᵃ thereof and spill back into the chamber 9. During this time, however, the pin 32 is guided by the appropriately curved slots 33 of the bracket arms 37 so that when the lever 60 is released or swung upwardly again the parts automatically resume their normal operating positions indicated by full lines in Figure 1. The tripping arms 54 of the trip 50 unbalances or provides an overhang at one side of the trip which biases it into engagement with its shoulder 48 when the pivot pin 32 seats against the bottom of its slots 33 at the completion of the resetting operation.

In order that the device may be manually tripped, that is to say, that the resetting lever 60 may be manipulated to cause the safety cut-off mechanism to function, one side of the body portion 51 of the trip 50 has an integral lateral extension 90 which projects in a direction opposite from the trip arm 54 and which underlies one portion of the T-shaped inner end 57 of the resetting lever. With this structure and due to the provision of the spring 59 the outer end of the resetting lever may be pulled upwardly to cause it to swing in a clockwise direction as viewed in Figure 1 until the end 57 of this resetting lever presses down on the extension 90 of the trip, whereupon the trip will be swung or rocked slightly to disengage it from the shoulder 48 and bring it into alinement with the slot 47 thereby allowing the safety lever 40 to punch the valve 19 closed under the influence of its weight 43.

Figure 4:
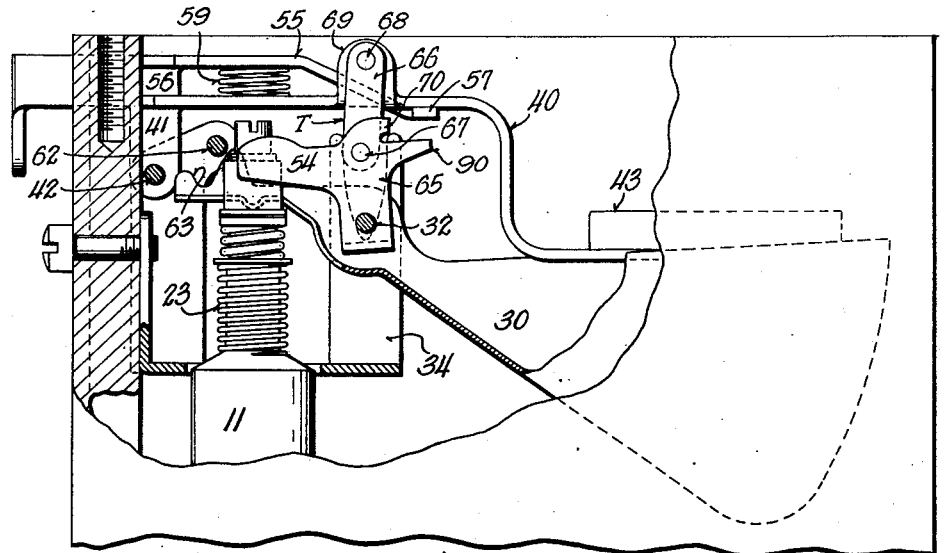
Figure 4 is a fragmentary view similar to Figure 1 but showing a modified form of the invention.

In the form of the invention shown in Figure 4, the inlet valve 19, spring 23, float 30, bracket 35, levers 40 and 55, are all constructed as before. In fact, the construction there shown is identical and the foregoing description applies thereto. The departure of the form shown in Figure 4 from that shown in Figure 1 resides in the way in which the trip corresponding to the trip 50 but designated in Figure 4 at 65 is constructed and combined with the safety cut-off lever. The trip is pivotally connected with the pivot pin 32 as in the other embodiment and has an identical releasing arm 54. To connect it with the lever 40 a link 66 is provided, one end being pivotally connected to the trip as at 67 and the other end being pivotally connected as at 68 to an extension 69 corresponding to the extension 46 but differing in that it is not slotted or shouldered but merely pivoted to the upper end of the link 66. The link 66 and the trip 65 provide a toggle T which may be broken only by moving or swinging the two parts thereof relative to each other in one direction since swinging movement in an opposite direction is limited by a stop lug 70 integral with the trip and overlapping one margin of the link 66.

With this construction, when the float 30 sinks due to being filled with liquid and its lever extension 26 engages the tripping arm 54 of the trip 65, the pivot 67 will be moved to the right as viewed in Figure 4 and when it passes a line intersecting the pivots 68 and 32 the toggle will be broken and the weighted lever 40 will punch the inlet valve closed. This device is reset and the float emptied in the manner previously described.

Figure 5:
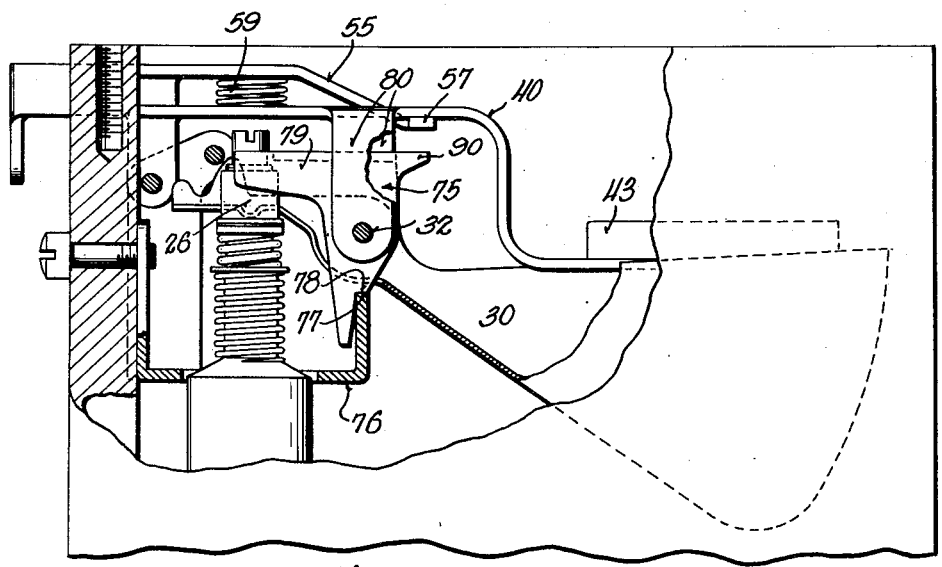
Figure 5 is a view similar to Figure 4 illustrating still another form of the invention.

In the form of the invention shown in Figure 5, the inlet valve 19, pan-type float 27, the safety cut-off lever 40 and resetting lever 55 are constructed and combined as before and the description hereinabove applies thereto. However, the means corresponding to the trip 50 and to the means which operatively interconnects this trip with the safety cut-off lever 40 is varied.

As illustrated in Figure 4, the member corresponding to the trip 50 or 65 of the previous embodiments is designated at 75 and is pivotally connected to the pin 32.

The pin 32 pivotally interconnects the float 30 with the trip 75 and also with integral downturned extension 80 provided on the safety cut-off lever 40. The mounting bracket 35 with its V-shaped slots 33 are omitted in this embodiment of the invention. In lieu thereof a bracket 76 is provided which presents a ledge 77 and the trip 75 has a shoulder 78 engageable with this ledge whereby to support the trip and also the pivot pin 32 when the float 30 is normally functioning to maintain a constant level in the liquid supply chamber. However, should the level rise abnormally and flow into the interior of the float 30 and cause it to sink, the arms of the bifurcated lever extension 26 will engage the trip arm 79 (corresponding to the trip arms 54) to disengage the shoulder 78 from the ledge 77 and thereby free the safety cut-off lever 40 to respond to the influence of its biasing weight 43 and punch the inlet valve closed.

From the foregoing it will be appreciated that in all embodiments of the invention the single-pan-type float 30 performs the dual function of normal maintaining a constant level in the supply chamber or reservoir and yet when the liquid rises a predetermined distance above the constant level this float operates to bring into action the safety cut-off mechanism. Moreover, when the difficulty has been corrected and the parts are to be reset the float is conveniently swung or shifted to a draining position so that the liquid therein will flow back into the supply chamber and need not be handled.

Another feature of the present invention is that these several advantages are realized in constructions which embody comparatively few parts. Thus, only a single valve is employed and there are comparatively few elements making up the constant level device, the safety cut-off mechanism and the resetting mechanism and all are so closely and compactly organized as to require but little space and to be reliable and safe in operation and durable in use. Furthermore, the device embodying the present invention may be economically manufactured.

While I have shown and described several constructions in which the invention may be embodied, it is to be understood that these several constructions have been selected merely for the purpose of illustration or example and that various changes in the size, shape and arrangement of the parts may be made without departing from the spirit of the invention or the scope of the subjoined claims.

The invention claimed is:

1. A constant level device comprising a chamber having an inlet, a valve controlling flow through the inlet, a pan-type float regulating the action of the valve normally to maintain a constant level in said chamber, the pan-type float having an opening in its upper portion whereby, when the level in the chamber rises above the selected level, liquid will flow into the float and the float will sink, safety cut-off mechanism operable to punch the inlet valve closed and having means for releasably retaining it against operation, said means being released by said float when the latter sinks, and means for resetting said safety cut-off mechanism and simultaneously causing the float to dump liquid from its interior back into said chamber.

2. A constant level device comprising a chamber having an inlet, a single valve controlling flow through the inlet, a pan-type float regulating the action of the valve normally to maintain a constant level in said chamber, the pan-type float having an opening in its upper portion whereby, when the level in the chamber rises above the selected level, liquid will flow into the float and the float will sink, a safety cut-off lever overlying the valve and biased to punch the same closed, and means normally holding said lever against movement but released upon sinking of the float to free the lever.

3. A constant level device comprising a chamber having an inlet, a valve controlling flow through the inlet, a pan-type float regulating the action of the valve normally to maintain a constant level in said chamber, the pan-type float having an opening in its upper portion whereby, when the level in the chamber rises above the selected level, liquid will flow into the chamber and the float will sink, a safety cut-off lever overlying the valve and biased to punch the same closed, and a trip interconnected with the float and the lever to normally retain the lever inactive but actuated to released position by the float when the float sinks.

4. A constant level device comprising a chamber having an inlet, a valve controlling flow through the inlet, a pan-type float regulating the action of the valve normally to maintain a constant level in said chamber, the pan-type float having an opening in its upper portion whereby, when the level in the chamber rises above the selected level, liquid will flow into the float and the float will sink, a safety cut-off lever overlying the valve and biased to punch the same closed, a trip interconnected with the float and the lever to normally retain the lever inactive but actuated to released position by the float when the float sinks, said float being swingable to an upwardly inclined position wherein any liquid therein will drain therefrom back into the chamber, and means for swinging the float to said upwardly inclined position.

5. A constant level device comprising a chamber having an inlet, a valve controlling flow through the inlet, a float regulating the action of the valve normally to maintain a constant level in said chamber and having an opening in its upper portion whereby, when the level in the chamber rises above the selected level, liquid will flow into the float and the float will sink, safety cut-off mechanism operable to punch the inlet valve closed and having means for releasably retaining it against operation, said means being released by said float when the latter sinks, said float being shiftable to a draining position wherein liquid therein will drain therefrom back into the chamber, and means for shifting the float to said draining position.

6. A constant level device comprising a casing providing a reservoir and provided with an inlet thereinto, a valve regulating the flow of liquid through the inlet, a pan-type float cooperable with the valve to maintain a predetermined constant level of liquid in the reservoir, said float being open at its top so that, upon failure of the valve to maintain the level, the abnormal rise will result in liquid flowing into the float and the float sinking into the liquid, a safety cut-off lever biased to punch the valve to closed position, means for releasably securing the lever in inactive position including a trip member pivotally interconnected with the float and cooperable in one of its positions with the lever to releasably maintain the same inactive but, in another of its positions, releasing the lever for response to its bias, said trip member having a laterally projecting arm adapted to be engaged by the float to effect its movement to release position.

7. A constant level device comprising a casing providing a reservoir, a valve regulating flow of liquid into the casing, a pan-type float cooperable with the valve to regulate its action and having an open top so that, upon failure of said valve to maintain said level, the abnormal rise of liquid will result in liquid flowing into the float and in the float sinking in the liquid, safety cut-off mechanism having a source of bias independent of the valve and its float interrelated with the float and cooperable with the valve whereby upon sinking of the float said mechanim will be tripped and brought into action, and resetting means for the safety cut-off mechanism, and also operable when actuated to cause the float to drain the liquid therefrom back into the reservoir.

8. A constant level device comprising a casing providing a reservoir, a single valve regulating flow into the casing, a pan-type float cooperable with the valve to maintain a constant level of liquid in the reservoir, said float having an open top whereby, upon abnormal rise of liquid, liquid will flow into the float and cause the same to sink, and safety cut-off mechanism including a normally inactive lever biased to punch the valve closed, and means interconnecting the lever and the float whereby, upon sinking of the float, the lever will be released to effect closure of said valve.

9. A constant level device comprising a casing providing a liquid supply chamber, a valve for regulating flow of liquid into the chamber, a pan-type float, means supporting the float for swinging movement, said float having a lever extension cooperable with the valve to normally maintain a constant level of liquid in the chamber, a normally inactive lever pivotally supported on the casing and biased to punch the valve closed, a trip supported for pivotal movement about the axis of swing of the float, means cooperating with the trip and the lever to maintain the lever inactive in one position of the trip although releasing it in another position thereof, an arm on the trip to be positioned to be engaged by the float when the latter sinks whereby to release the lever, and resetting mechanism for the lever and trip acting when operated to cause the float to swing upwardly to a position where the liquid therein is drained therefrom.

10. A constant level device comprising a casing providing a liquid supply chamber, a valve for regulating flow of liquid into the chamber, a pan-type float, means supporting the float for swinging movement and also for bodily upward movement in the casing, said float having a lever extension cooperable with the valve to normally maintain a constant level of liquid in the chamber, a normally inactive lever pivotally supported on the casing and biased to punch the valve closed, a trip supported for pivotal movement about the axis of swing of the float, means cooperating with the trip and the lever to maintain the lever inactive in one position of the trip although releasing it in another position thereof, an arm on the trip positioned to be engaged by the float when the latter sinks whereby to release the lever, and a resetting lever pivotally mounted on the casing and interconnected with said safety lever, said last-named means providing a connection between the safety lever and the float and a second fulcrum in said casing with which said lever extension is cooperable when it and the float are moved upwardly by actuation of the resetting lever, whereby upon operation of the resetting lever the float will be swung to an upper inclined position wherein its liquid contents will drain back into the chamber.

11. A constant level device comprising a casing providing a liquid supply chamber, a valve regulating flow into the casing, a pan-type float cooperable with the valve to maintain a constant level of liquid in the chamber, said float being open at its top so that abnormal rise of liquid in the chamber will cause the liquid to flow thereinto to cause the float to sink, a safety cut-off lever mounted in the casing and biased to punch the valve closed, and a toggle interconnecting the float and the lever to normally maintain the lever inactive, said toggle being broken upon sinking of the float to allow the lever to act.

12. A constant level device comprising a casing providing a liquid supply chamber, a valve regulating flow of liquid into the chamber, a pan-type float having an open top and provided with a lever extension, a pivot pin connected to the float and projecting at its ends therebeyond, a support having slots accommodating the projecting ends of the pivot pin, said lever extension of the float coacting with the valve so that the float normally maintains a constant level of liquid in the chamber, a safety cut-off lever pivoted in the casing and biased to punch the valve closed, a trip pivotally mounted on said pin and interconnected with the lever to releasably maintain the same in inactive position, said member having an arm positioned in the path of movement of the lever extension of the float so that when the float sinks the trip will be moved to release the lever, a fulcrum positioned above the outer end of said lever extension, and a resetting lever interconnected with the safety cut-off lever and operable to swing the same upwardly to lift the trip and float whereby to cause the lever extension to engage said fulcrum and the float to swing to an inclined draining position.

13. A constant level device comprising a casing providing a liquid supply chamber, a valve regulating flow of liquid into the chamber, a pan-type float having an open top and provided with a lever extension pivotally supported in the casing and coacting with the valve so that the float normally maintains a constant level of liquid in the chamber, a safety cut-off lever pivoted in the casing and biased to punch the valve closed, a trip pivotally mounted on said pivotal support and interconnected with the lever to maintain the same in inactive position, said trip having an arm positioned in the path of movement of the lever extension so that when the float sinks the member will release the lever, in combination with a re-setting lever pivoted to the casing and interconnected with said safety lever, said re-setting lever being effective, during resetting, to act through the safety lever, and said trip to swing the float to an upwardly inclined position whereby its liquid contents are drained back into said chamber as an incident to the resetting of the parts.

14. A constant level device comprising a casing providing a reservoir, an inlet valve regulating flow into the reservoir, a pan-type float having a lever extension cooperable with said valve, a fulcrum pin for the lever extension adjacent its juncture with the float, means supporting said fulcrum pin but allowing the same to move bodily upwardly, a normally inactive lever pivotally supported on the casing and biased to punch the inlet valve closed, a trip supported on said fulcrum pin for pivotal movement, a connection between said trip and said normally inactive lever, said trip in one position acting with said connection to maintain the lever in its inactive position and in another position releasing the lever to allow it to punch the valve closed, a resetting lever pivotally mounted on the casing and interconnected with the safety lever, and a second fulcrum supported within the casing, the outer end of the lever extension being adapted to engage said second fulcrum when the resetting lever is swung to lift the first-named fulcrum bodily upwardly from its supporting means whereby the float may be swung to an upwardly inclined position to drain its contents back into the reservoir.

15. A constant level device comprising a casing providing a reservoir, a valve regulating flow into the reservoir, a pan-type float cooperable with the valve to regulate its action and having an open top so that upon failure of said valve to maintain said lever, the abnormal rise of liquid will result in liquid flowing into the float and in the float sinking in the reservoir, a safety cut-off mechanism interrelated with the float and cooperable with the valve whereby, upon sinking of the float, said mechanism will be brought into action to close the valve, a fulcrum about which said float is normally constrained to swing, a second fulcrum for the float, and resetting means operable to cause the float to swing upwardly about its said second fulcrum to a position where the liquid in the float will be drained back into the reservoir during the resetting operation.

16. A constant level device comprising a chamber having a reservoir, a valve regulating flow of liquid thereinto, a pan-type float having a lever extension cooperable with the valve, a fulcrum for the lever extension interrelated therewith and with the float so that normally the float and lever extension control the valve as a lever of the first class to maintain a constant level in said reservoir, a second fulcrum for the lever extension and positioned whereby when the lever extension cooperates therewith, the float and lever extension will operate as a lever of the third class, safety cut-off mechanism operable to punch the valve closed upon abnormal rise of liquid in the reservoir and flow of liquid into the float, and resetting mechanism for said safety cut-off mechanism and interconnected with the float and its lever extension whereby upon actuation of the resetting mechanism the float and its lever extension will be brought into cooperation with the second fulcrum to cause to operate as a lever of the third class and thereby swing to an upwardly inclined position to drain the liquid from the interior of the float back into the reservoir.

17. A constant level device comprising a casing providing a reservoir and provided with an inlet thereinto, a valve regulating the flow of liquid through the inlet, a pan-type float cooperable with the valve to maintain a predetermined constant level of liquid in the reservoir, said float being open at its top so that, upon failure of the valve to maintain the level, the abnormal rise will result in liquid flowing into the float and the float sinking into the liquid, a safety cut-off lever biased to punch the valve to closed position, means for releasably securing the lever in inactive position including a trip member pivotally interconnected with the float and cooperable, in one of its positions, with the lever to releasably maintain the same inactive but, in another of its positions, releasing the lever for response to its bias, said float acting when it sinks to move said trip to released position, a resetting lever interconnected with said safety cut-off lever and movable relative thereto in one direction, said trip having a portion with which said resetting lever is cooperable when it is moved relative to the safety cut-off lever whereby to manually release the safety cut-off lever for operation.

18. A constant level device comprising a casing providing a liquid supply chamber, a valve for regulating flow of liquid into the chamber, a pan-type float, means supporting the float for swinging movement, said float having a lever extension cooperable with the valve to normally maintain a constant level of liquid in the chamber, a normally inactive lever pivotally supported on the casing and biased to punch the valve closed, a trip supporting for pivotal movement about the axis of swing of the float, a slotted and shouldered member secured to and extending upwardly from the lever, said trip having an inturned portion overlying the lever and cooperable with said slotted and shouldered member to maintain the lever inactive in one position of the trip although releasing it in another position thereof, an arm on the trip to be positioned to be engaged by the float when the latter sinks whereby to release the lever, and resetting mechanism for the lever and trip acting when operated to cause the float to swing upwardly to a position where the liquid therein is drained therefrom.

19. A device of the character described comprising a casing having a chamber, a constant level device for maintaining a constant level of liquid in said chamber and including a float having an opening in its top whereby, upon predetermined rise of liquid in the chamber above said constant level, liquid will flow into the float and the float will sink, safety cut-off mechanism having a source of bias independent of the constant level device and its float and tripped and brought into action upon sinking of said float, and means for shifting the float to a draining position, above the level of liquid in said chamber.

20. A constant level device comprising a casing providing a liquid supply chamber, an inlet valve regulating flow of liquid into the chamber, a pan-type float cooperable with said valve to maintain a constant level of liquid in said chamber, a normally inactive safety cut-off lever pivotally mounted in the casing and biased to punch the inlet valve closed, a bracket having a ledge, a trip having a shoulder adapted to be supported on the ledge, and means pivotally interconnecting the trip, float and safety cut-off lever, said float being operable to shift the trip and disengage its shoulder from the ledge when the liquid in the chamber rises above a selected constant level.

21. A constant level device of the character described comprising a casing providing a liquid supply chamber and having an inlet thereto, a valve regulating flow through the inlet, a pan-type float connected to the valve and normally buoyed up by the liquid in the supply chamber to retain a constant level in said chamber, said float sinking in the liquid upon abnormal rise of the liquid level in the chamber, and safety cut-off mechanism, operable independently of the connection between said float and said valve and actuated upon sinking of the float to shut off further flow of liquid to the chamber.

LOURDES V. McCARTY.